(12) United States Patent
D'Agostino

(10) Patent No.: US 9,663,021 B1
(45) Date of Patent: May 30, 2017

(54) EXPANDING CLAMPING TWISTLOCK FOR ISO APERTURE SECUREMENT

(71) Applicant: NORTHROP GRUMMAN SYSTEMS CORPORATION, Falls Church, VA (US)

(72) Inventor: Andrew J. D'Agostino, Levittown, NY (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 15/199,521

(22) Filed: Jun. 30, 2016

Related U.S. Application Data

(60) Provisional application No. 62/312,928, filed on Mar. 24, 2016.

(51) Int. Cl.
| B60P 7/08 | (2006.01) |
| B60P 7/13 | (2006.01) |
| B65D 90/00 | (2006.01) |
| B63B 25/24 | (2006.01) |

(52) U.S. Cl.
CPC .............. B60P 7/132 (2013.01); B63B 25/24 (2013.01); B65D 90/0013 (2013.01)

(58) Field of Classification Search
CPC ........ B60P 7/132; B65D 9/0013; B63B 25/24
USPC ......... 410/82, 83, 69, 73, 70, 74, 79; 24/287
See application file for complete search history.

(56) References Cited

U.S. PATENT DOCUMENTS

| 3,367,615 | A | | 2/1968 | Turpen | |
|---|---|---|---|---|---|
| 3,578,374 | A | | 5/1971 | Glassmeyer | |
| 3,825,294 | A | | 7/1974 | Carr | |
| 3,906,870 | A | | 9/1975 | Alberti | |
| 3,972,439 | A | | 8/1976 | DiMartino | |
| 3,989,294 | A | | 11/1976 | Carr | |
| 4,925,349 | A | | 5/1990 | Yurgevich | |
| 5,106,247 | A | * | 4/1992 | Hove | B60P 7/132 410/73 |
| 5,454,673 | A | | 10/1995 | DiMartino | |
| 6,270,300 | B1 | | 8/2001 | Huber et al. | |
| 6,336,765 | B1 | | 1/2002 | Watanabe | |
| 6,490,766 | B1 | | 12/2002 | Tiemann | |
| 7,637,704 | B2 | | 12/2009 | Morin | |
| 7,942,282 | B2 | | 5/2011 | Hung | |
| 8,007,214 | B2 | * | 8/2011 | Brewster | B60P 7/132 410/69 |
| 8,157,490 | B2 | | 4/2012 | Park | |
| 8,458,861 | B2 | | 6/2013 | Östberg | |

(Continued)

*Primary Examiner* — Stephen Gordon
(74) *Attorney, Agent, or Firm* — John A. Miller; Miller IP Group, PLC

(57) ABSTRACT

A twistlock for securing a structure to a corner fitting having an ISO aperture. The twistlock includes a main body, a first clamping cam toggle pivotally mounted within the main body and a second clamping cam toggle pivotally mounted within the main body. The twistlock also includes a T-clamp screw having a body portion, a threaded end portion and a clamping portion, where the body portion extends through an opening in the main body and between the first and second cam toggles so that the clamping portion is positioned adjacent to an outside of a bottom wall of the main body. The T-clamp screw is rotatable to engage an underside of a wall in the corner fitting and the first and second cam toggles are pivotable to engage edges of the aperture in the fitting.

20 Claims, 4 Drawing Sheets

(56) References Cited

U.S. PATENT DOCUMENTS

| | | |
|---|---|---|
| 8,684,644 B2 | 4/2014 | Metternich |
| 9,011,055 B1 | 4/2015 | Royt |
| 9,238,430 B2 | 1/2016 | Metternich |
| 2003/0164375 A1 | 9/2003 | Neufingerl |
| 2008/0210687 A1 | 9/2008 | Clive-Smith |
| 2010/0290855 A1 | 11/2010 | Strien |
| 2015/0224913 A1 | 8/2015 | Royt |

* cited by examiner

EXPANDING CLAMPING TWISTLOCK FOR ISO APERTURE SECUREMENT

CROSS-REFERENCE TO RELATED APPLICATIONS

This application claims the benefit of the priority date of U.S. Provisional Patent Application Ser. No. 62/312,928, titled, Expanding Clamping Twistlock for ISO Aperture Securement, filed Mar. 24, 2016.

GOVERNMENT CONTRACT

This invention was made with Government support under contract N00024-15-C-6311 awarded by the Naval Sea Systems Command. The Government has certain rights in the invention.

BACKGROUND

Field

This invention relates generally to a twistlock and, more particularly, to an expanding clamping twistlock that has particular application for engaging an ISO aperture in a fitting, where the twistlock employs a system of screws and cams that secure a structure in both a fore/aft direction and a vertical direction.

Discussion

Massive container ships that are able to transport many shipping container across oceans and between countries generally define worldwide commerce. The shipping containers transported by these ships have a certain size, weight and configuration that are defined by the International Organization for Standardization (ISO). In order to comply with ISO requirements, the shipping containers include a corner fitting securely mounted to each of the eight corners of the container that allows the container to be lifted by a crane using suitable connecting mechanisms, such as hooks, and allow the shipping containers to be secured to the deck of the ship and to each other so that the containers can be stacked on the deck to a height that is often times breath taking. Each of the corner fittings includes specially configured slots or ISO apertures in the faces of the fitting directed outward, where each fitting will include a top or bottom aperture, a front or back aperture and a side aperture. Further, ISO apertures are generally provided at desirable locations in the deck of the ship. Other types of ships, such as various navy ships, also employ various types of fittings that have ISO apertures.

Connectors are required to engage the ISO apertures in the corner fittings or otherwise so as to allow the containers to be secured to each other and to the deck of the ship in a manner that allows the containers to be reliably coupled together in the open sea. These connectors often employ a twistlock design where an engaging portion of the connector is inserted into the ISO aperture and is rotated to engage an underside surface within the fitting to secure the connector to the fitting. Various types of twistlock designs are known in the industry that operate in this manner.

In many of these twistlock designs, the engaging portion of the twistlock has a size that is significantly smaller than the ISO aperture so that there is "play" in all directions after the twistlock is secured to the fitting, and thus, known twistlocks may not provide a tight fit between ISO apertures. For applications where twistlocks are used for securing a structure to the deck of a ship that may not be shipping containers, where multiple twistlocks may be employed to secure the structure, one or a few of the twistlocks may be carrying the entire load in these other directions, providing a recipe for failure. Therefore, it would be desirable to have a twistlock for securing shipping containers or other structures to the deck of a ship that eliminates play and provides a tight fit to evenly spread the load between fittings along all axes.

DETAILED DESCRIPTION OF THE EMBODIMENTS

The following discussion of the embodiments of the invention directed to an expanding clamping twistlock is merely exemplary in nature, and is in no way intended to limit the invention or its applications or uses. For example, the twistlock of the invention as described herein will have particular application to be coupled to an ISO aperture of a corner fitting for a shipping container or other structure. However, the twistlock of the invention may have application to be coupled to other types of fittings.

Figure 1:
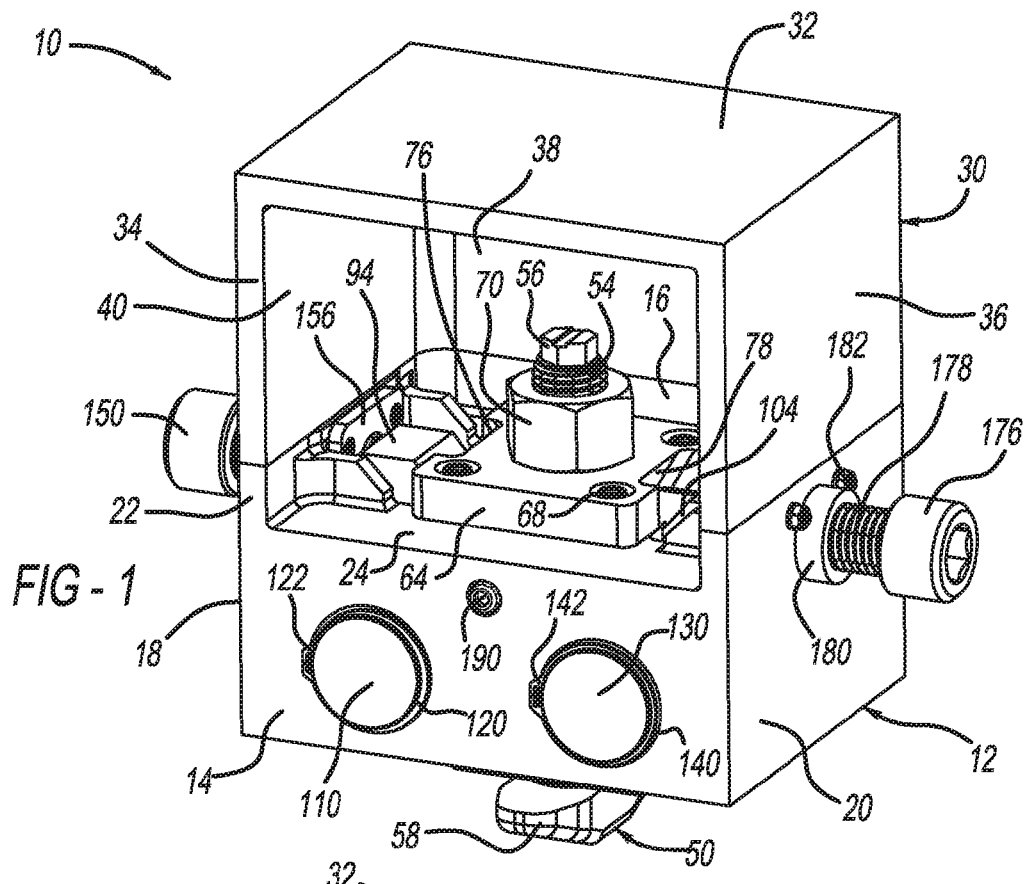
FIG. 1 is an isometric view of an expanding clamping twistlock.
Figure 3:
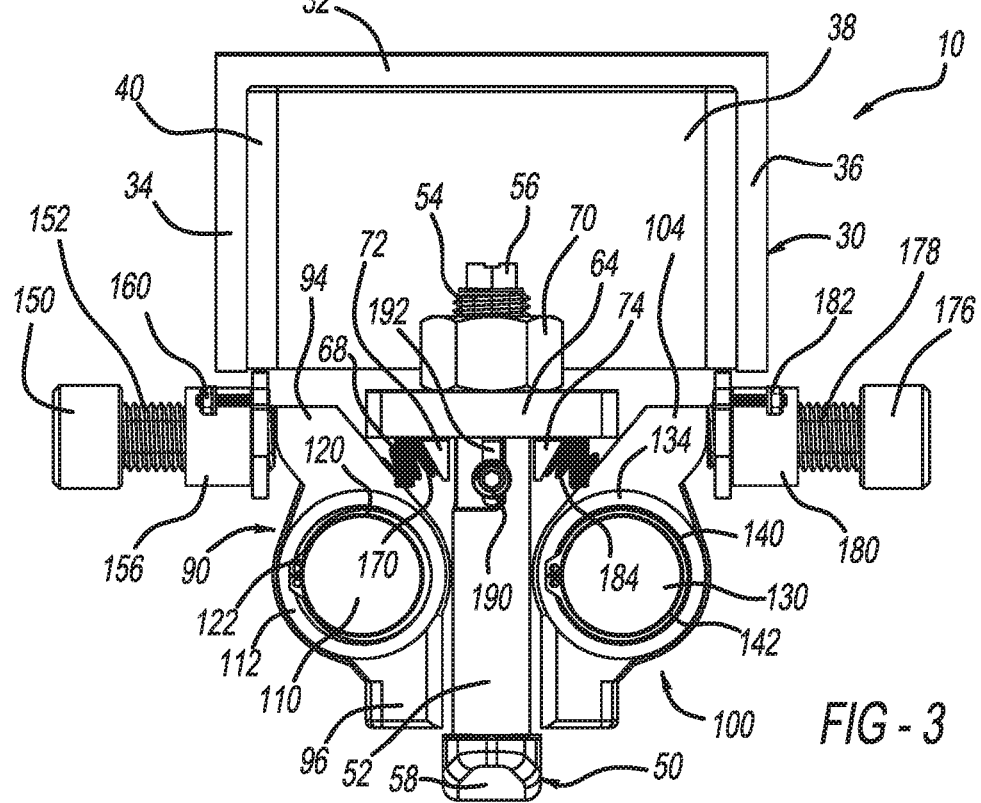
FIG. 3 is a front view of the expanding clamping twistlock shown in FIG. 1 with a main body removed.
Figure 2:
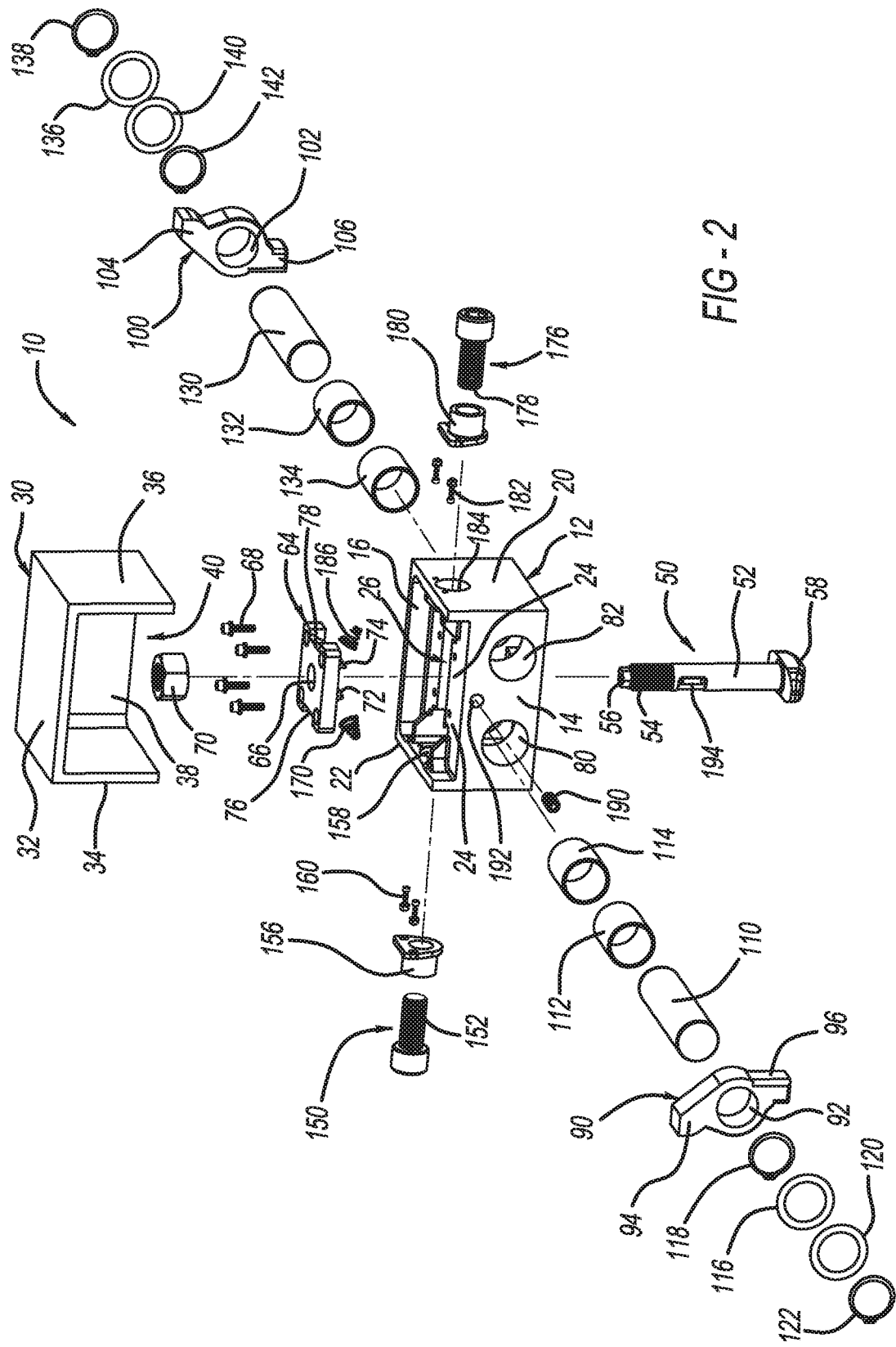
FIG. 2 is an exploded view of the expanding clamping twistlock shown in FIG. 1.

FIG. 1 is an isometric view and FIG. 2 is an exploded view of an expanding clamping twistlock 10 including a main body 12 that is a machined block of metal, such as steel, that includes various openings, shapes, surfaces, etc. to receive the various components and elements discussed herein. FIG. 3 is a front view of the twistlock 10 with the main body 12 removed. The main body 12 has a general rectangular shape including a front wall 14, a back wall 16, side walls 18 and 20, a top rim 22 defining a recess 24 and a bottom wall, where an internal slot 26 is formed in the main body 12. The twistlock 10 also includes an upper housing 30 having a top wall 32, side walls 34 and 36, and a back wall 38 defining an enclosure 40, where the upper housing 30 is open to the bottom and front, as shown, and where the side walls 34 and 36 rest on the rim 22 where the upper housing 30 is secured to the main body 12.

The twistlock 10 further includes a T-clamp screw 50 having a cylindrical body portion 52, an upper threaded portion 54 at the end of the body portion 52, a screw tip 56, and a transverse clamping portion 58 coupled to the body portion 52 opposite to the threaded portion 54. The cylindrical body portion 52 is inserted into an opening in the bottom wall of the main body 12 so that the tip 56 extends through the slot 26 and into the recess 24. A shelf plate 64 is positioned within the recess 24 so that the tip 56 of the screw 50 extends through an opening 66 in the plate 64, where the shelf plate 64 is bolted to a top surface within the recess 24 by bolts 68, as shown. A nut 70 is threaded onto the threaded portion 54 to hold the T-clamp screw 50 in place. The shelf plate 64 includes a pair of opposing spring wedges 72 and 74 extending from a bottom surface of the plate 64 and a pair of opposing side recesses 76 and 78 for reasons that will become apparent from the discussion below, where the wedges 72 and 74 extend into the slot 26.

The body 12 includes a pair of side-by-side bores 80 and 82 that extend front-to-back through the front wall 14 and the back wall 16 of the housing 12, as shown. The twistlock 10 includes a first clamping cam toggle 90 having a central opening 92, a top cam portion 94 and a bottom cam portion 96, and a second clamping cam toggle 100 having a central opening 102, a top cam portion 104 and a bottom cam portion 106, where the cam toggles 90 and 100 are pivotally mounted within the slot 26 as discussed herein. Particularly, a shaft 110 extends through the bore 80 and the opening 92 in the cam toggle 90, where the shaft 110 also extends through bronze bushings 112 and 114 provided within the bore 80 and positioned one on each side of the cam toggle 90. A stainless steel disc shim 116 and a stainless steel retaining ring 118 secure the shaft 110 to the body 12 at the back wall 16, and a stainless steel disc shim 120 and a stainless steel retaining ring 122 secure the shaft 110 to the body 12 at the front wall 14. Likewise, a shaft 130 extends through the bore 82 and the opening 102 in the cam toggle 100, where the shaft 130 also extends through bronze bushings 132 and 134 provided within the bore 82 and positioned one on each side of the cam toggle 100. A stainless steel disc shim 136 and a stainless steel retaining ring 138 secure the shaft 130 to the body 12 at the back wall 16, and a stainless steel disc shim 140 and a stainless steel retaining ring 142 secure the shaft 130 to the body 12 at the front wall 14.

The cam toggle 90 is pivoted on the shaft 110 by a toggle bolt 150 having a threaded portion 152, where the threaded portion 152 is threaded into a screw bushing 156 that is bolted to the side wall 18 by bolts 160. The threaded portion 152 extends through an opening 158 in the side wall 18 and engages the top cam portion 94 of the cam toggle 90, as shown. A conical return spring 170 is positioned between the cam portion 94 and the wedge 72 to push the cam toggle 90 back to a home position when the bolt 150 is unthreaded. Likewise, the cam toggle 100 is pivoted on the shaft 130 by a toggle bolt 176 having a threaded portion 178, where the threaded portion 178 is threaded into a screw bushing 180 that is bolted to the side wall 20 by bolts 182. The threaded portion 178 extends through an opening 184 in the side wall 20 and engages the top cam portion 104 of the cam toggle 100, as shown. A conical return spring 186 is positioned between the cam portion 104 and the wedge 74 to push the cam toggle 100 back to a home position when the bolt 176 is unthreaded.

A ball plunger 190 is threaded into an opening 192 in the front wall 14 of the housing 12 and engages a stop slot 194 in the body portion 52 of the T-clamp screw 50 that operates as a hard limit so as to limit the amount the T-clamp screw 50 can be rotated.

Figure 4:
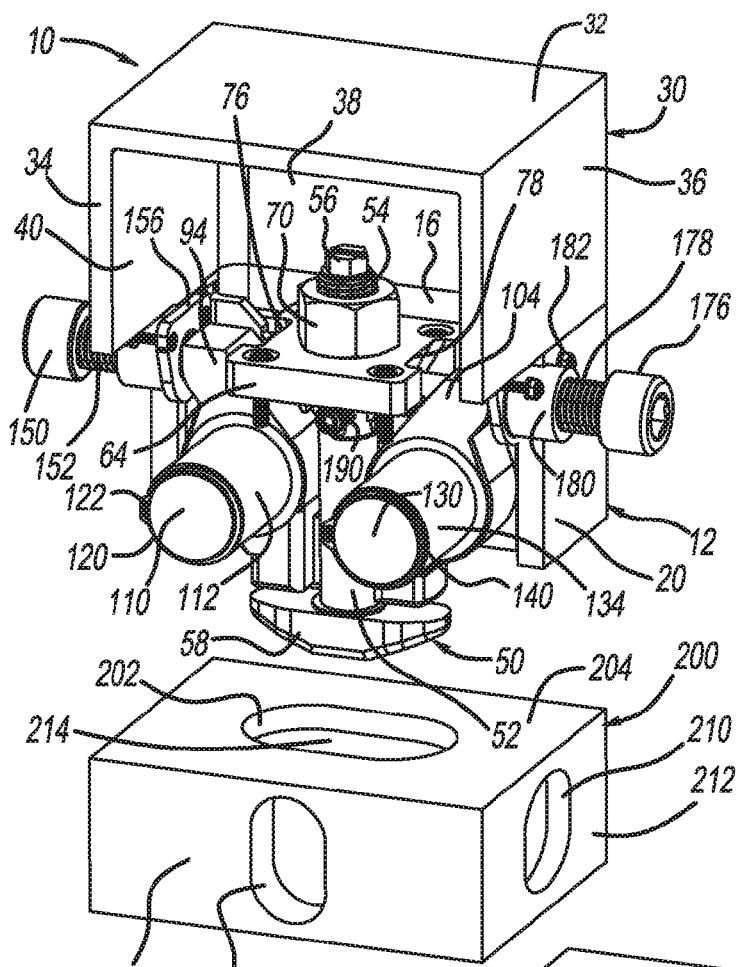
FIG. 4 is an isometric view of the expanding clamping twistlock shown in FIG. 1 and being positioned relative to a corner fitting.
Figure 5:
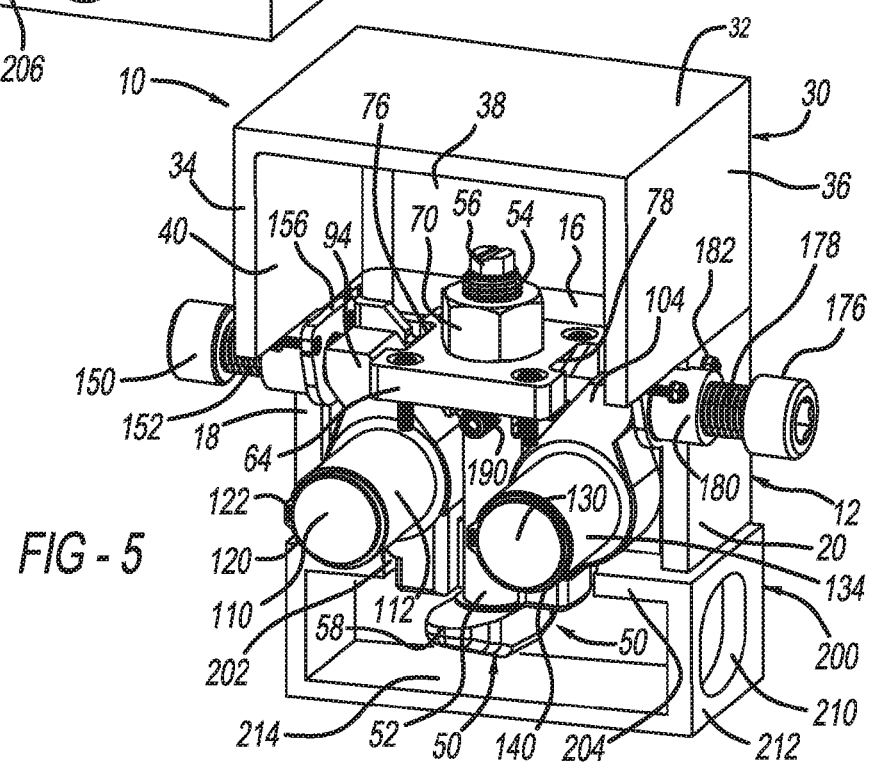
FIG. 5 is an isometric view of the expanding clamping twistlock being inserted into an ISO aperture of the corner fitting.
Figure 6:
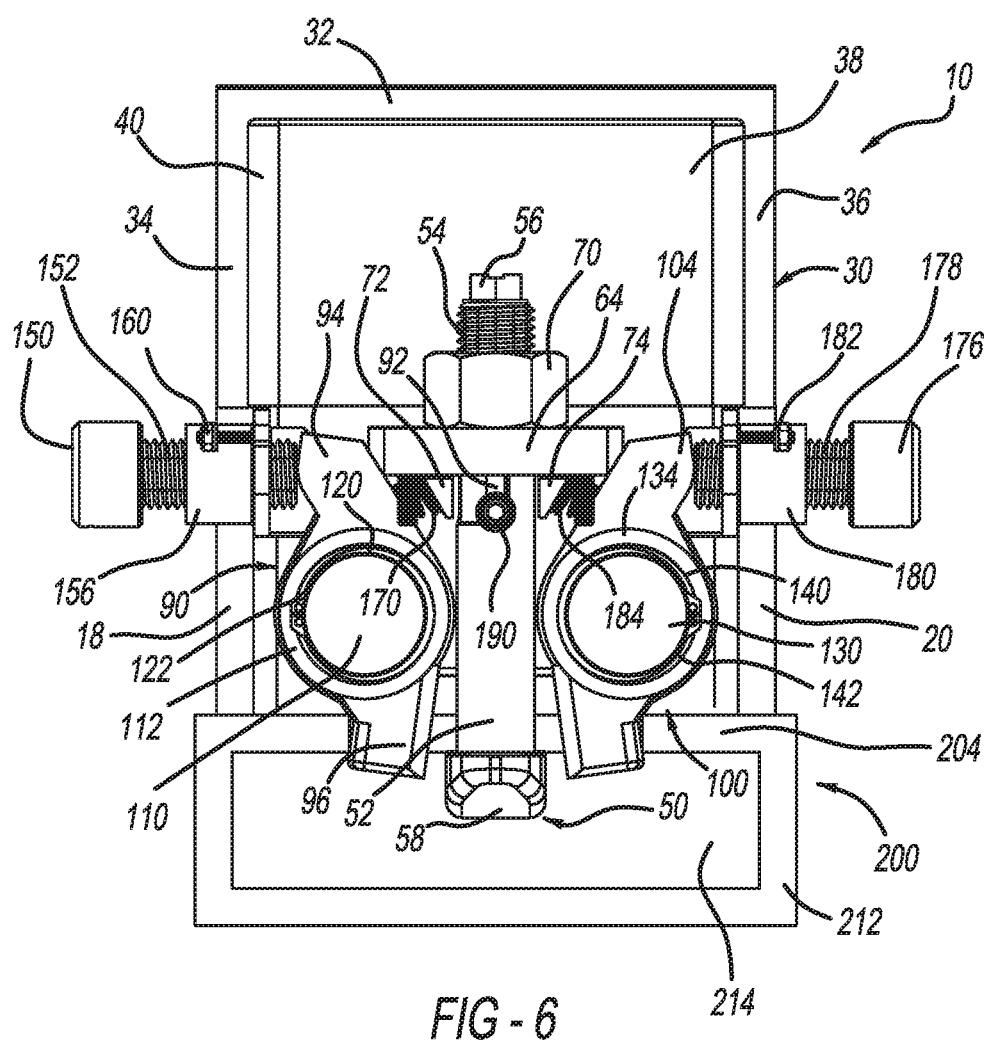
FIG. 6 is an isometric view of the expanding clamping twistlock positioned within the corner fitting and being clamped thereto.

The twistlock 10 is designed to engage and be locked to a corner fitting of the type referred to above. FIGS. 4-6 show the process of how the twistlock 10 is secured to a corner fitting 200 that could be, for example, provided at the corners of a shipping container or other structure. However, it is stressed that the corner fitting 200 can be provided in any suitable structure such as the deck of a ship. The corner fitting 200 includes a top ISO aperture 202 formed through a top wall 204 of the fitting 200, a side ISO aperture 206 formed through a side wall 208 of the fitting 200, and a side ISO aperture 210 formed through an end wall 212 of the fitting 200, where the apertures 202, 206 and 210 are open to a chamber 214 within the fitting 200. The corner fitting 200 is shown broken away in FIGS. 5 and 6 to illustrate the chamber 214 in the fitting 200.

The twistlock 10 is positioned relative to the corner fitting 200 so that the clamping portion 58 lines with up the aperture 202, as shown in FIG. 4. The twistlock 10 is then moved downward to engage the corner fitting 200 so that the clamping portion 58 travels through the aperture 202 to be positioned within the chamber 214. A suitable wrench (not shown) is then used to engage the tip 56 through the open front of the upper housing 30 to rotate the T-clamp screw 50 and cause the clamping portion 58 to be substantially perpendicular to the length of the aperture 202, where the ball plunger 190 hits a hard stop defined by the stop slot 194 in the body portion 52 when the clamping portion 58 is properly positioned. FIG. 4 shows the clamping portion 58 below the cam portions 96 and 106 of the cam toggles 90 and 100. When the T-clamp screw 50 is turned when it is inside of the fitting 200, in the orientation as shown in FIG. 5, the clamping portion 58 is able to be drawn up between the cam portions 96 and 106. The nut 70 is rotated on the threaded portion 58 generally using a suitable wrench (not shown) so that the clamping portion 58 is drawn up and clamps against an underside of the top wall 204. This provides rigidity in the up/down direction. Once in this position, a suitable wrench (not shown) is used to turn the bolts 150 and 176 to pivot the cam toggles 90 and 100 on the shafts 110 and 130, respectively, where the top cam portions 94 and 104 are pushed into the recesses 76 and 78 in the plate 64, which causes the bottom cam portions 96 and 106 to pivot away from the T-clamp screw 50 and engage inside edge portions of the opening 202 as shown in FIG. 6, which provides stability of the twistlock 10 in a fore/aft orientation.

The upper housing 30 can be coupled to any suitable structure, such as by welding, couplers, or the like, to connect the corner fitting 200 to other devices, such as other corner fittings, other twistlocks, etc., so as to secure the corner fitting to those devices.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:
1. A twistlock comprising:
    a main body including a front wall, a back wall, opposing side walls and a bottom wall, said body further including an internal slot and first and second bores extending through the body from the front wall to the back wall and through the slot;
    a first shaft extending through the first bore and a second shaft extending through the second bore;
    a first clamping cam toggle including an opening through which the first shaft extends, said first cam toggle being positioned in the slot;
    a second clamping cam toggle including an opening through which the second shaft extends, said second cam toggle being positioned in the slot;
    a T-clamp screw including a body portion, a threaded end portion at one end of the body portion, and a clamping portion at an opposite end of the body portion, said body portion extending through an opening in the main body and through the slot between the first and second cam toggles so that the clamping portion is positioned adjacent to an outside of the bottom wall of the main body; and a first toggle bolt extending through one of the side walls of the main body and engaging the first cam toggle and a second toggle bolt extending through the other side wall of the main body and engaging the second cam toggle, wherein the T-clamp screw is rotatable to engage an underside of a wall in a fitting and the first and second toggle bolts are operable to toggle the first and second cam toggles to engage edges of an aperture in the fitting through which the T-clamp screw extends.

2. The twistlock according to claim 1 wherein the fitting is a corner fitting having apertures defined by the International Organization for Standardization (ISO).

3. The twistlock according to claim 2 wherein the corner fitting is mounted in a deck of a ship or is mounted to a corner of a shipping container.

4. The twistlock according to claim 1 wherein the main body includes an upper rim opposite to the bottom wall and defining a recess therein where the threaded end portion of the T-clamp screw is positioned.

5. The twistlock according to claim 4 further comprising an upper housing including opposing side walls, a back wall and a top wall configured so that the upper housing has an opening towards a front of the main body and to the recess such that the side walls and back wall of the upper housing are positioned on the upper rim so as to allow a nut threaded onto the threaded end portion to be accessible through the opening.

6. The twistlock according to claim 5 further comprising a shelf plate secured to the main body in the recess, said shelf plate including a central opening through which the threaded end portion of the T-clamp screw extends and having a top surface to which the nut rests on.

7. The twistlock according to claim 6 wherein the shelf plate includes opposing side recesses that each receive a top cam portion of the first or second cam toggle when the first and second toggle bolts toggle the first and second cam toggles.

8. The twistlock according to claim 7 further comprising first and second return springs, said shelf plate further including first and second wedges secured to a bottom surface of the shelf plate and extending into the slot, said first spring engaging the first wedge and the top cam portion of the first cam toggle and said second spring engaging the second wedge and the top cam portion of the second cam toggle so as to return the first and second cam toggles to a home position when the first and second toggle bolts are retracted.

9. The twistlock according to claim 1 further comprising a ball plunger threaded through the front wall of the main body, said body portion of the T-clamp screw including a stop slot that engages the ball plunger and prevents the T-clamp screw from being rotated beyond a predetermined position.

10. The twistlock according to claim 1 wherein the T-clamp screw further includes a screw tip at an end of the threaded portion opposite to the clamping portion that is operable to rotate the T-clamp screw between an insertion position and a clamping position.

11. A twistlock for securing to a fitting having an aperture defined by the International Organization for Standardization (ISO), said twistlock comprising:

a main body including a front wall, a back wall, opposing side walls and a bottom wall;

a first clamping cam toggle pivotally mounted within the main body;

a second clamping cam toggle pivotally mounted within the main body; and a T-clamp screw including a body portion, a threaded end portion at one end of the body portion and a clamping portion at an opposite end of the body portion, said body portion extending through an opening in the main body and between the first and second cam toggles so that the clamping portion is positioned adjacent to an outside of the bottom wall of the main body, wherein the T-clamp screw is rotatable to engage an underside of a wall in the fitting and the first and second cam toggles are pivotable to engage edges of the aperture in the fitting.

12. The twistlock according to claim 11 further comprising a first toggle bolt extending through one of the side walls of the main body and engaging the first cam toggle and a second toggle bolt extending through the other side wall of the main body and engaging the second cam toggle, wherein the first and second toggle bolts are operable to toggle the first and second cam toggles to engage edges of the aperture in the fitting through which the T-clamp screw extends.

13. The twistlock according to claim 11 wherein the main body includes an upper rim opposite to the bottom wall and defining a recess therein where the threaded end portion of the T-clamp screw is positioned.

14. The twistlock according to claim 13 further comprising an upper housing including opposing side walls, a back wall and a top wall configured so that the upper housing has an opening towards a front of the main body and to the recess such that the side walls and back wall of the upper housing are positioned on the upper rim so as to allow a nut threaded onto the threaded end portion to be accessible through the upper housing opening.

15. The twistlock according to claim 14 further comprising a shelf plate secured to the main body in the recess, said shelf plate including a central opening through which the threaded end portion of the T-clamp screw extends and having a top surface to which the nut rests on.

16. The twistlock according to claim 15 wherein the shelf plate includes opposing side recesses that each receive a top cam portion of the first or second cam toggle.

17. The twistlock according to claim 16 further comprising first and second return springs, said shelf plate further including first and second wedges secured to a bottom surface of the shelf plate, said first spring engaging the first wedge and the top cam portion of the first cam toggle and said second spring engaging the second wedge and the top cam portion of the second cam toggle so as to return the first and second cam toggles to a home position.

18. The twistlock according to claim 11 further comprising a ball plunger threaded through the front wall of the main body, said body portion of the T-clamp screw including a stop slot that engages the ball plunger and prevents the T-clamp screw from being rotated beyond a predetermined position.

19. A twistlock for securing to a fitting having an aperture defined by the International Organization for Standardization (ISO), said twistlock comprising:

a main body including a front wall, a back wall, opposing side walls and a bottom wall, said body further including an internal slot and first and second bores extending through the body from the front wall to the back wall and through the slot;

a first shaft extending through the first bore and a second shaft extending through the second bore;

a first clamping cam toggle including an opening through which the first shaft extends, said first cam toggle being positioned in the slot;

a second clamping cam toggle including an opening through which the second shaft extends, said second cam toggle being positioned in the slot;

a T-clamp screw including a body portion, a threaded end portion at one end of the body portion, and a clamping portion at an opposite end of the body portion, said body portion extending through an opening in the main body and through the slot between the first and second cam toggles so that the clamping portion is positioned adjacent to an outside of the bottom wall of the main body, wherein the main body includes an upper rim opposite to the bottom wall and defining a recess therein where the threaded end portion of the T-clamp screw is positioned;

an upper housing including opposing side walls, a back wall and a top wall configured so that the upper housing has an opening towards a front of the main body and to the recess such that the side walls and back wall of the upper housing are positioned on the upper rim so as to allow a nut threaded onto the threaded end portion to be accessible through the upper housing opening;

a shelf plate secured to the main body in the recess, said shelf plate including a central opening through which the threaded end portion of the T-clamp screw extends and having a top surface to which the nut rests on;

a first toggle bolt extending through one of the side walls of the main body and engaging the first cam toggle and a second toggle bolt extending through the other side wall of the main body and engaging the second cam toggle, wherein the T-clamp screw is rotatable to engage an underside of a wall in the fitting and the first and second toggle bolts are operable to toggle the first and second cam toggles to engage edges of the aperture in the fitting through which the T-clamp screw extends, wherein the shelf plate includes opposing side recesses that each receive a top cam portion of the first or second cam toggle when the first and second toggle bolts toggle the first and second cam toggles; and first and second return springs, said shelf plate further including first and second wedges secured to a bottom surface of the shelf plate and extending into the slot, said first spring engaging the first wedge and the top cam portion of the first cam toggle and said second spring engaging the second wedge and the top cam portion of the second cam toggle so as to return the first and second cam toggles to a home position when the first and second toggle bolts are retracted.

20. The twistlock according to claim 19 wherein the fitting is mounted in a deck of a ship or is mounted to a corner of a shipping container.

* * * * *